Aug. 12, 1969     G. R. ONUFER     3,460,682
FUEL LINE FILTER
Filed Feb. 21, 1967
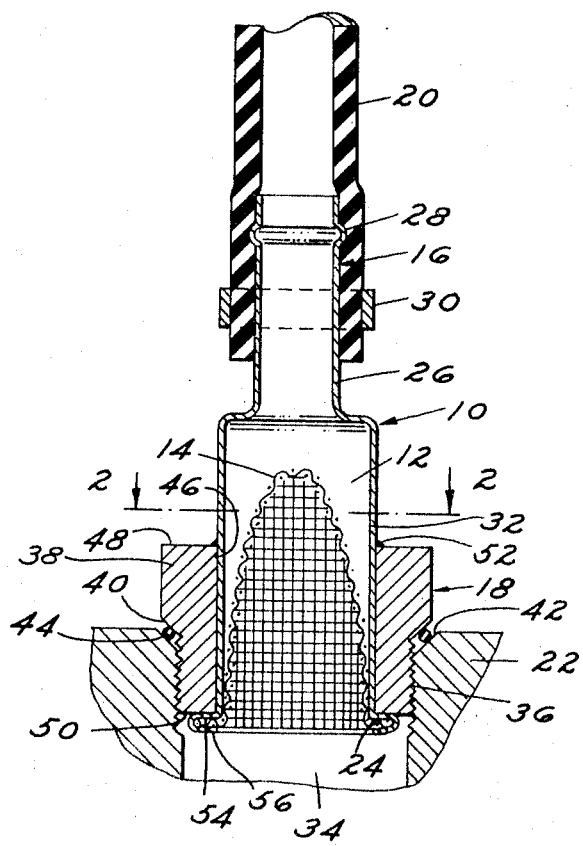
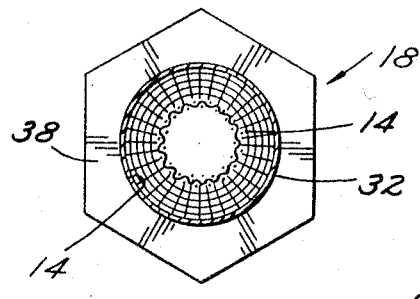
INVENTOR
GEORGE R. ONUFER
BY
*Burton & Parker*
ATTORNEYS 3,460,682
FUEL LINE FILTER
George Rohall Onufer, Bloomfield Hills, Mich., assignor to RB&W Fabricated Metal Products, Inc., Livonia, Mich., a corporation of Michigan
Filed Feb. 21, 1967, Ser. No. 617,566
Int. Cl. B01d 27/00, 35/02, 29/04
U.S. Cl. 210—448  2 Claims

ABSTRACT OF THE DISCLOSURE

This disclosure relates to a filter particularly suitable for use as a fuel line filter for internal combustion engines wherein the filter element is housed in a tubular part adapted to be connected at one end with the fuel line hose and at the other end provided with a nut sealingly brazed to the tube with the filter secured in the tube in a manner permitting ready quality control inspection as well as inspection for accumulation of filtered waste.

---

This invention relates to filters for fluid handling systems and is particularly though not exclusively adapted for use as fuel line filter for automotive internal combustion engines.

Heretofore a wide variety of filters for the purpose of filtering gasoline prior to entry into the carburetor have been proposed and used. Many such filters have been effective to filter out undesirable fuel contaminates but a need has existed for a simple, effective, and inexpensive filter that might be inserted in the fuel line at the fuel inlet port of the carburetor, a filter which would be screwed into the port much like any screw threaded fitting, would not leak, and which would provide a projection to which the fuel line could be readily connected. One such filter heretofore proposed has suffered two major drawbacks: (1) a tendency to allow fuel leaks and (2) difficulty of inspection for proper securement of the filter element in the fitting and/or difficulty of inspection for accumulation of filtered waste. Both of these disadvantages are overcome with the filter disclosed herein and other advantages also obtained.

An object of the invention is the provision of a filter comprising a tubular part housing the filter element and adapted to be connected at one end to the fuel line and having at the opposite end a nut to which it is positively sealingly secured and by means of which it may be connected in the carburetor fuel intake port.

Another object is the provision of a filter wherein the filter element comprises a perforated sheath, such as fine wire mesh, the rim of the open end of which is gripped at one end of the filter body for retention in the body, in a manner permitting ready inspection for quality control. A concomitant object is the provision of means for securement of the filter which is of low cost, does not interfere with the fuel flow and permits ready inspection for accumulation of filtered waste material.

Other objects, advantages, and meritorious features of this invention will more fully appear from the following specification, claims, and accompanying drawings, wherein:

FIGURE 1 is a cross sectional view through an embodiment of the invention showing the same received in a carburetor fuel intake port and with a fuel line hose attached; and FIGURE 2 is a sectional view taken in the direction of 2—2 of FIGURE 1.

Broadly the invention includes a tubular member 10 defining therewithin a filter element chamber 12 housing a filter element 14 with the tubular member provided with means 16 and 18 at opposite ends to facilitate connecting it into fluid system components 20 and 22. The tubular member is provided with a radially inwardly opening channel 24 encircling the chamber to receive and retain the peripheral edge of the filter element and retain the same in the chamber. It will be noted that the tubular member 10 comprises a single integral piece of tubing which may be formed by relatively simple forming operations, and when sealingly secured in means 18 will not admit of any fluid pressure leaks.

More specifically the tubular member 10 is provided with a reduced diameter portion 26 which may exhibit an annular rib 28, and over which the fuel line hose is telescoped and secured in any convenient manner as by a clamp, schematically represented at 30.

That portion 32 of the tube lying between the reduced diameter portion 26 and the channel 24 defines the filter element receiving chamber 12, which has a greater diameter than the portion 26 to accommodate the filter element 14. It will be noted that the chamber and the filter element are coaxial with the portion 26 and the port 34 of the carburetor 22 into which the filter is connected.

The tube 32 is provided with a nut 18 which is externally threaded at 36 for threaded connection with complementary threads of the port 34. The nut has a wrench engaging portion 38 spaced from the threaded end 36 by an outwardly tapering seal ring receiving surface 40 opposed to the complementary tapered mouth 42 of the port. Any suitable seal ring, such as a neoprene or the like O-ring 44 may be mounted on the nut to be squeezed between the tapered surfaces to effect the seal between the nut and port. Other forms of seal may be alternatively provided as required, for example tapered pipe threads, in which event the tapers 40 and 42 might be eliminated. In any event some suitable seal is intended between the nut and port, and the provision of the nut affords a variety of sealing possibilities.

The nut is provided with a bore 46 coaxial with threads 36 which opens through opposite end faces 48 and 50. The tubular member is a close fit in bore 46. The tube may be permanently and sealingly secured in the bore by brazing, as at 52, sweating, or any other suitable fashion.

The tube projects beyond opposite ends of the nut 18 and at its inner end is folded upon itself radially outwardly of the I.D. of the tube at the end of chamber 12 to form the radially inwardly opening channel 24. The channel juxtaposes the inner end 50 of the nut.

The filter element 14 which may comprise a suitable fine mesh screen, is shown in the form of a sheath, generally conoidal with the peripheral edge 54 being turned radially outwardly and received within channel 24. The channel walls may be deformed against the rim 54 of the filter element to grippingly engage it and retain the filter in the chamber 12 against dislodgement.

Manufacture of the filter may be carried out as follows. A suitable length and diameter of metal tubing is formed to the shape shown in FIGURE 1 but with the lowermost wall 56 of the channel 24 left extending downwardly. The tube is then slipped into the nut and passed through a brazing operation to rigidly and sealingly secure the two. The sheath-like filter element 14 preshaped as shown, is then inserted into the chamber and the lowermost wall 56 bent toward and flattened against the rim 54 of the filter element to grip the rim and permanently retain the element in the chamber.

It will be noted the tubing should be sufficiently deformable to allow the flattening of the channel walls to grip the rim of the filter element and yet be sufficient to withstand collapse by introduction of the hose 20 and tightening of the clamp 30.

At the completion of manufacture, inspection for proper entrapment of the filter element by the channel 24 can be readily carried out, and inspection for a good braze line at 52 can also be readily observed. If a seal ring 44 is to be provided by the manufacturer such may be mounted prior to inspection, if desired.

What is claimed is:

1. A fuel line filter for an internal combustion engine carburetor having a threaded inlet port provided with an outwardly tapering mouth comprising: a nut member having external threads at one end for threaded connection in the carburetor port and an external wrench engaging portion at the opposite end spaced from the threads by a tapered seal ring engaging surface adapted to confront the tapered port mouth when the nut is screwed into the port, a sealing ring on the nut member encircling said surface for squeezing between it and the tapered port mouth to effect a seal therebetween, said nut member provided with a bore opening through opposite ends coaxial with the threads, a tube disposed in said bore and brazed therein to be integral and fluid tight with the nut and projecting beyond opposite ends thereof, that end of the tube projecting beyond the threaded end of the nut being folded upon itself radially outwardly of the I.D. of the tube to provide a radially inwardly opening channel juxtaposing the end face of the nut, the opposite end of the tube projecting beyond the wrench engaging portion of the nut provided with a reduced diameter hose receiving end portion for coupling with a fuel line hose, that portion of the tube between said channel and said reduced diameter portion defining a filter receiving chamber with said channel defining one end of the chamber and said reduced diameter portion defining the opposite end of said chamber, and a sheath-like filter disposed in said chamber and having a radially outwardly turned rim at the open end disposed in said channel and grippingly retained therein by the walls of the channel flattened thereagainst.

2. A combination fuel line filter and hose connector for a threaded port comprising: a nut member externally threaded at one end for threaded connection with the port and an external wrench engaging portion at the opposite end, a tubular member having a filter chamber portion opening outwardly at one end and at the other end terminating in a reduced diameter portion for connection within a hose, the said tubular member secured in coaxial fluid-tight alignment to said nut member with the threaded end of the one and the hose receiving end of the other being at opposite ends of the assembly, said tubular member having adjacent its outwardly opening end a radially outwardly extending flange overlying an adjacent surface of the nut member, a sheath-like filter disposed in said chamber portion and having its rim turned radially outwardly to overlie said flange, and one of said members having a circumferential lip portion overlying the rim of the filter and said flange and deformed tightly against said rim and flange to secure the filter in the chamber.

References Cited

UNITED STATES PATENTS 2,430,921 11/1947 Edelmann _____ 285—174 X
2,658,625 11/1953 Rafferty _____ 210—448 X
2,893,756  7/1959 Sundstrom _____ 285—212 X REUBEN FRIEDMAN, Primary Examiner T. A. GRANGER, Assistant Examiner U.S. Cl. X.R.

210—449